J. R. KREISER.
NUT MAKING MACHINE.
APPLICATION FILED JULY 3, 1913.
1,100,891.
Patented June 23, 1914.
9 SHEETS—SHEET 2.
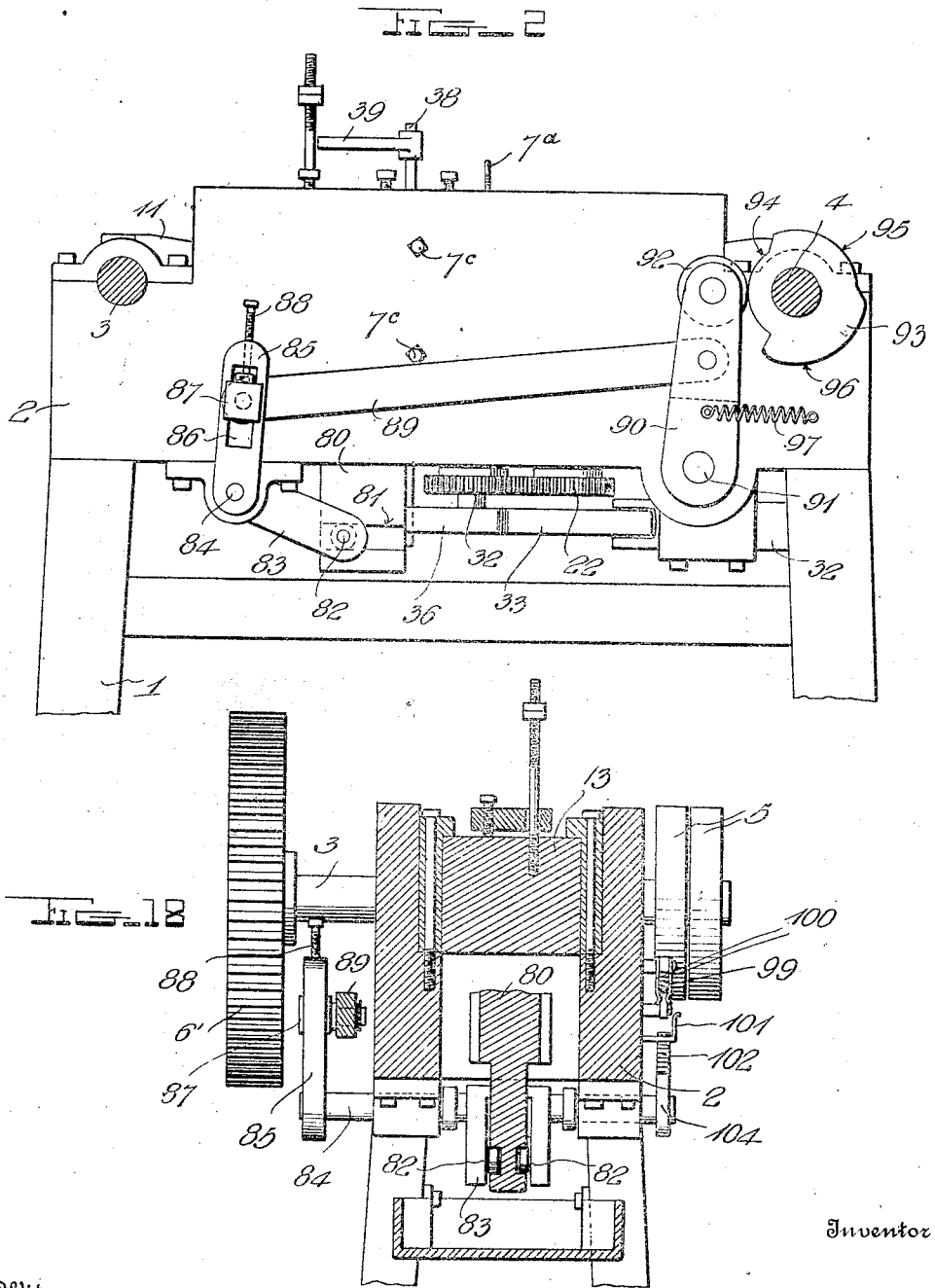
Witnesses
M. H. Stuard
Inventor
John R. Kreiser
by H. B. Willson & Co
Attorneys

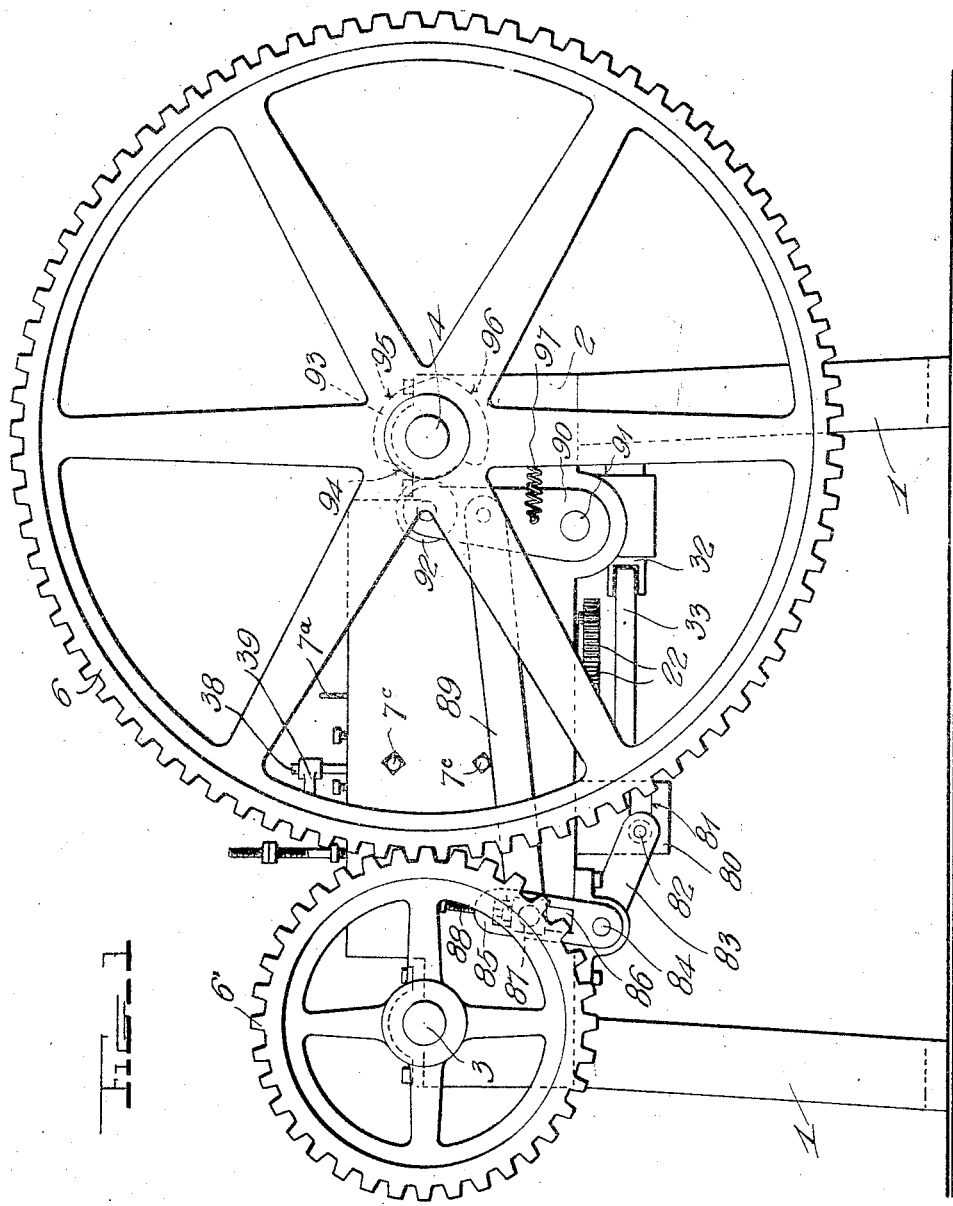

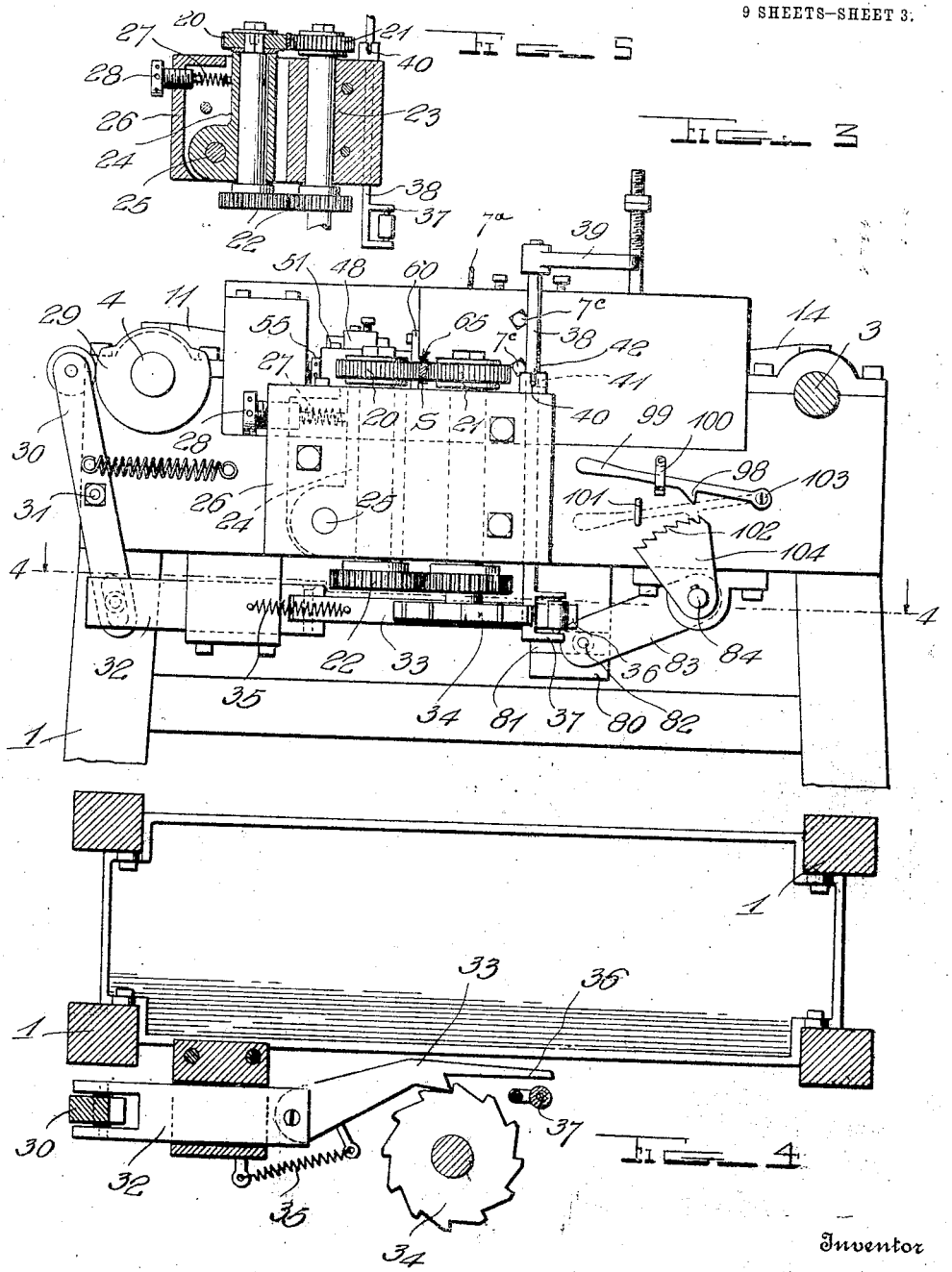

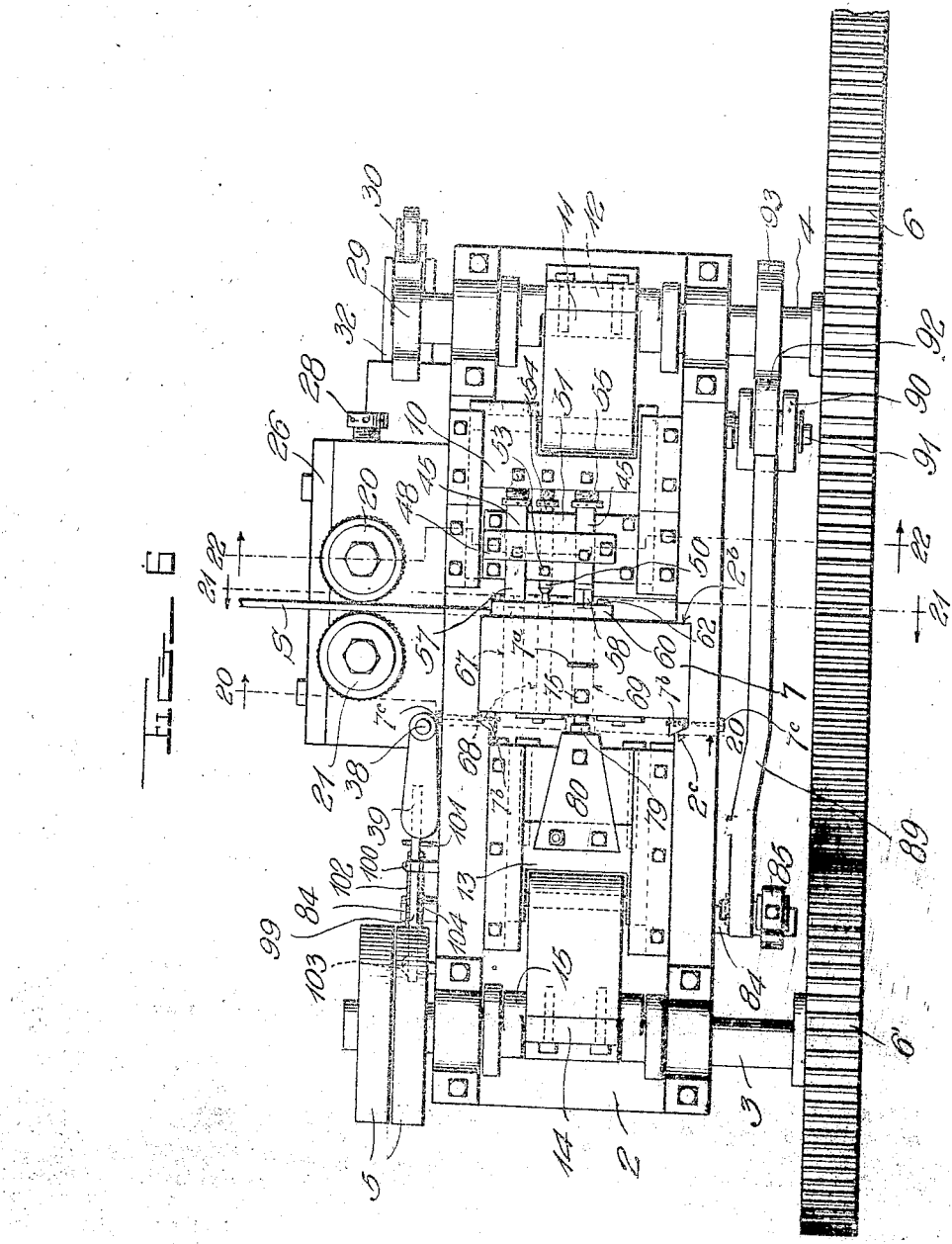

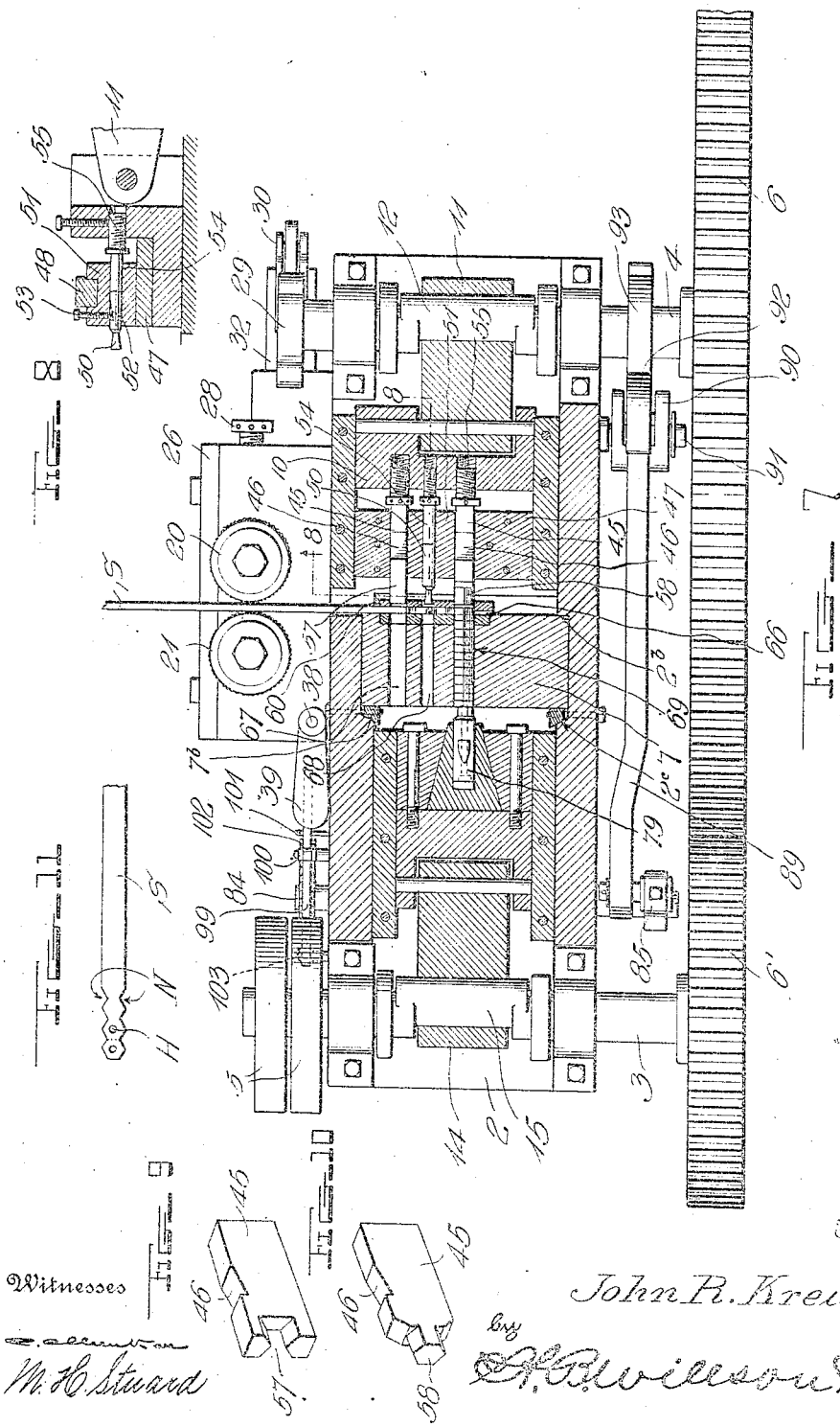

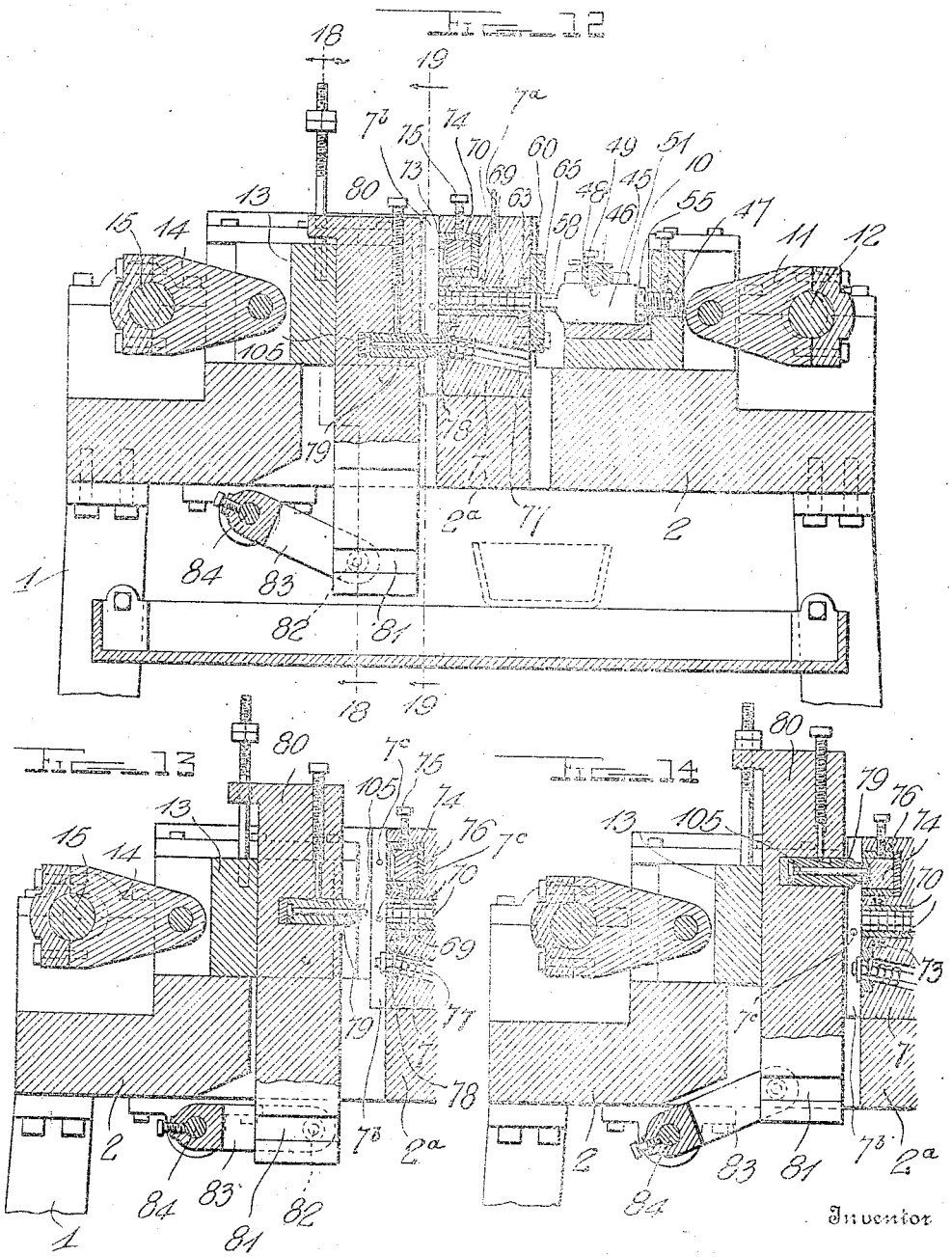

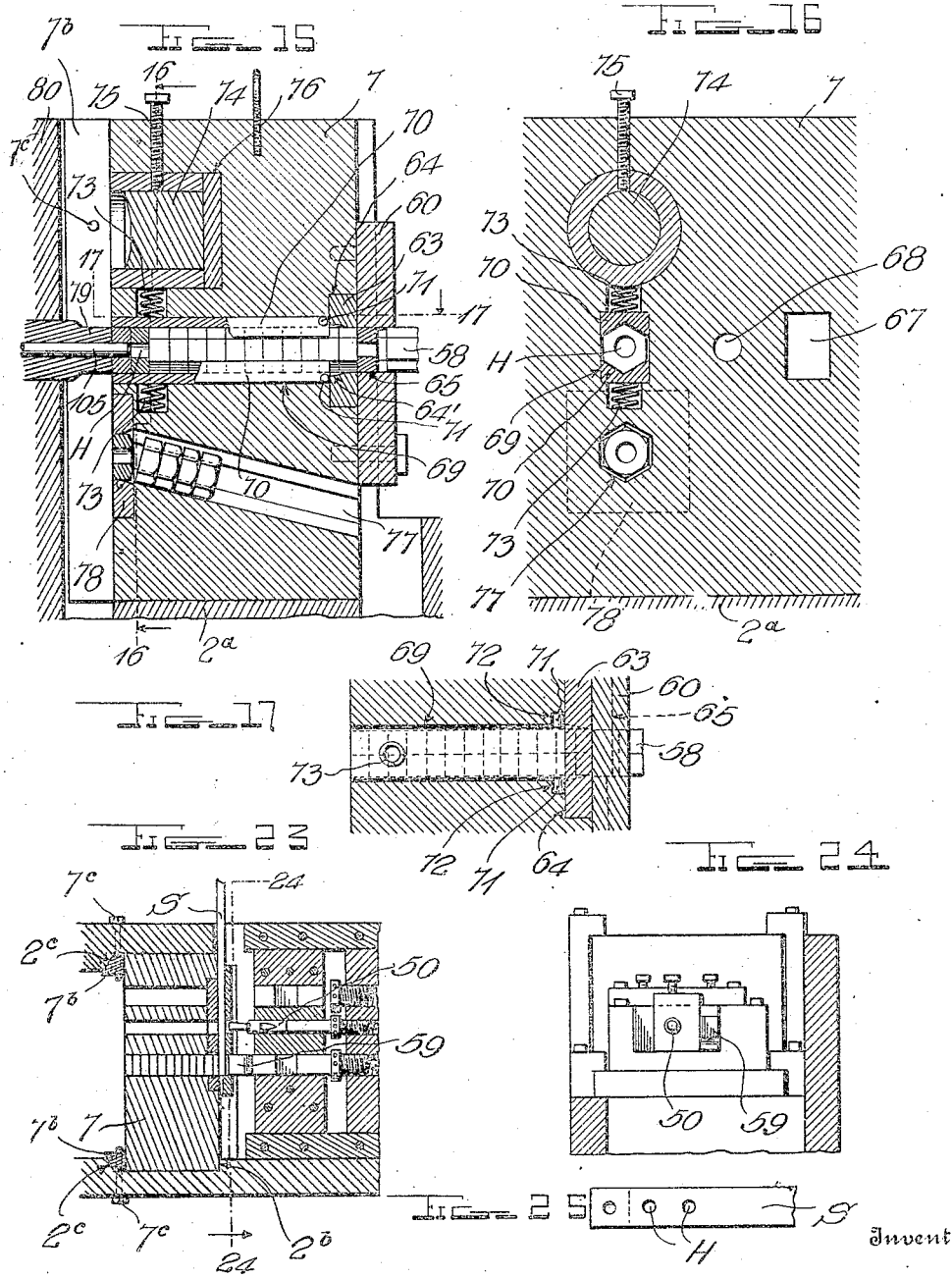

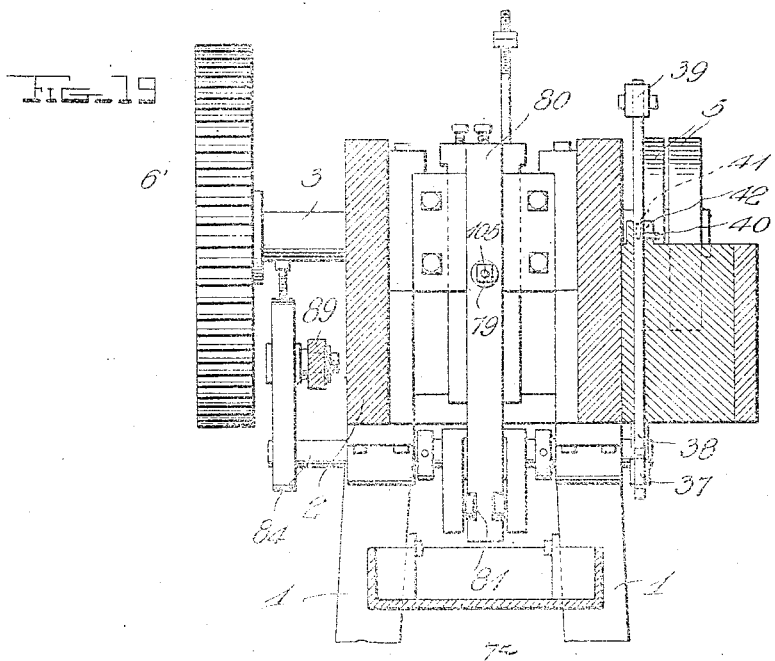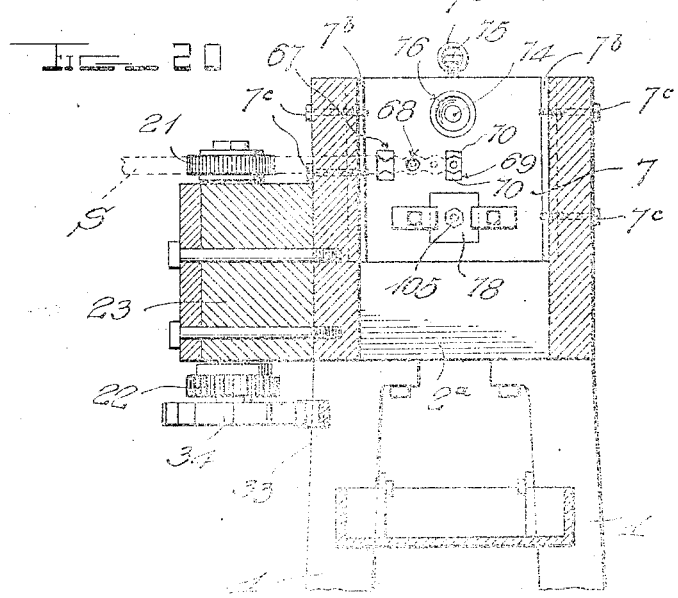

J. R. KREISER.
NUT MAKING MACHINE.
APPLICATION FILED JULY 3, 1913.
1,100,891.
Patented June 23, 1914
9 SHEETS—SHEET 9.
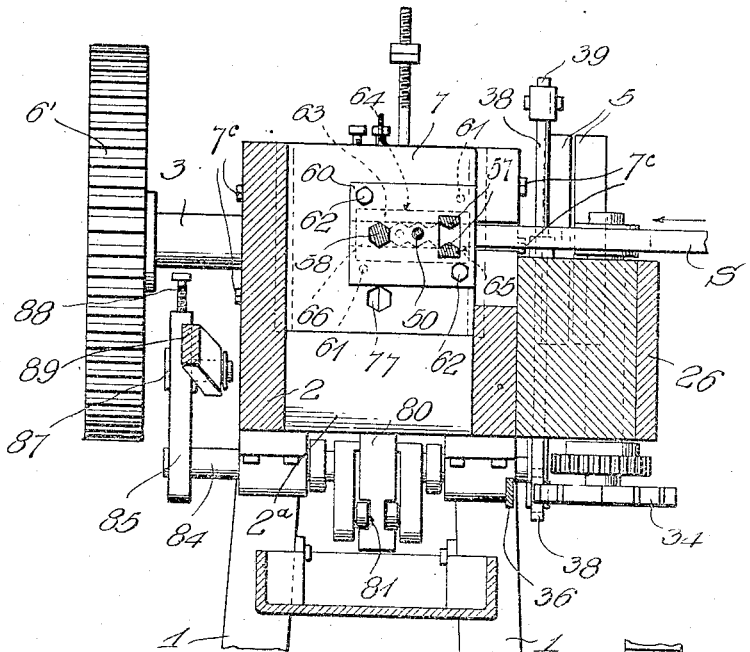
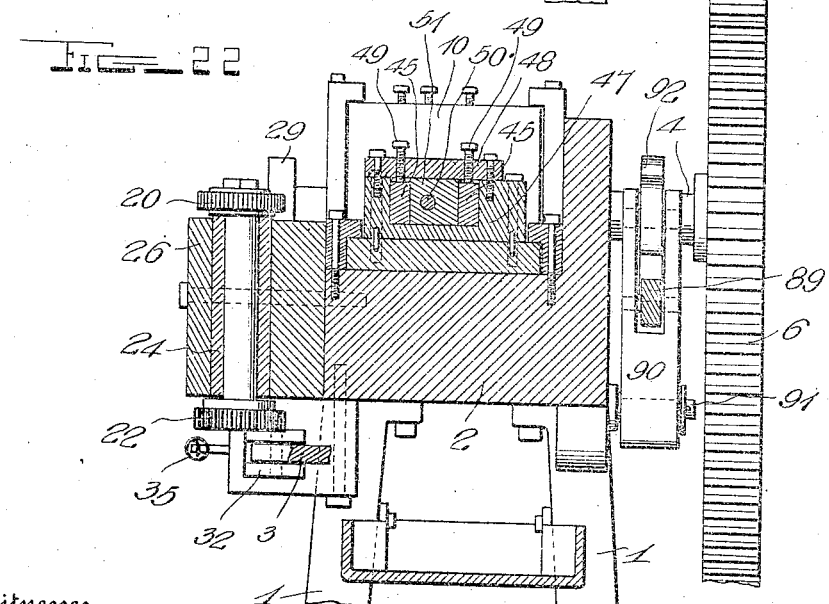
Witnesses
Inventor
John R. Kreiser
Attorneys

UNITED STATES PATENT OFFICE.

JOHN R. KREISER, OF LEBANON, PENNSYLVANIA.

NUT-MAKING MACHINE.

1,100,891.

Specification of Letters Patent.

Patented June 23, 1914.

Application filed July 3, 1913. Serial No. 777,328.

*To all whom it may concern:*

Be it known that I, JOHN R. KREISER, a citizen of the United States, residing at Lebanon, in the county of Lebanon and State of Pennsylvania, have invented certain new and useful Improvements in Nut-Making Machines; and I do declare the following to be a full, clear, and exact description of the invention, such as will enable others skilled in the art to which it appertains to make and use the same.

This invention relates to nut making machines, and more especially to those having a double-punch drive; and the object of the same is to produce a simple and efficient machine (adjustable in all important parts) for rapidly turning out nuts of various sizes and shapes, with or without the finishing operation of crowning and shaping.

This object is carried out by constructing the machine in the manner hereinafter more fully described and claimed and as shown in the drawings wherein—

Figure 1 is a side elevation of this machine complete. Fig. 2 is a similar elevation with the intermeshing gear wheels removed. Fig. 3 is an elevation of the opposite side, and Fig. 4 is a horizontal section on the line 4—4 of Fig. 3. Fig. 5 is a vertical sectional detail through the feed mechanism. Fig. 6 is a plan view of the machine complete, and Fig. 7 is a similar view with parts in horizontal section. Fig. 8 is a vertical sectional detail through the punch, taken on about the line 8—8 of Fig. 7. Figs. 9 and 10 are perspective details of the forked and the blocking dies. Fig. 11 is a plan view of the blank from which the nuts are to be made. Figs. 12, 13, and 14 are longitudinal vertical sections through the rear or finishing portion of the machine, showing the parts in various positions; and Fig. 15 is an enlarged section showing the carrier in the act of picking up a nut in order to take it to the crowning mechanism. Fig. 16 is a section on the line 16—16 of Fig. 15, and Fig. 17 is a horizontal section on the line 17—17 of Fig. 15. Figs. 18 and 19 are vertical sections on the lines 18—18 and 19—19 respectively of Fig. 12. Figs. 20, 21, and 22 are vertical sections on the line 20—20, 21—21 and 22—22 respectively of Fig. 6. Fig. 23 is a fragmentary section, similar to that shown in Fig. 7, giving a slight modification; and Fig. 24 is a section on the line 24—24 of Fig. 23. Fig. 25 is a plan view of the blank from which the nuts are made by this modification.

In the embodiment of my machine illustrated in the accompanying drawings, legs 1 support a table 2 which may well be called the bed of the machine, and on the same in suitable bearings are mounted a power shaft 3 across one end and a driven shaft 4 across the other, the former having fast and loose pulleys 5 of any suitable means for connecting it with a source of power, and the two shafts being connected by intermeshing gears 6 and 6′ whereof the former has three times the number of teeth of the latter. The bed or table is of proper construction and sufficient strength to withstand the strain which is to be thrown upon it, and contains proper guides for the parts yet to be described; and across its center is removably fixed a web or block 7 pierced with openings for a purpose which will appear, as best seen in Figs. 6, 7, and 12. To the right of this web the bed carries a male die head (see Fig. 8) designated as a whole by the reference numeral 10, and the same is connected by a pitman 11 with a crank 12 on the driven shaft 4. To the left of said web the bed carries a carrier head 13 which is connected by a pitman 14 with a crank 15 on the power shaft 3, and from the relative size of the gears 6 and 7 it follows that the carrier head will reciprocate toward and from the web 7 three times as fast as the die head.

The feed mechanism for the stock S (which latter consist of a strap of metal as usual) is shown in the present embodiment of my invention as embracing two roughened or milled wheels 20 and 21 mounted fast on upright shafts which are connected at their lower ends by gears 22, one shaft being journaled in a fixed bearing 23 and the other in a movable bearing 24 which is pivoted at 25 within a casing 26 and pressed normally inward by means of a spring 27 rendered adjustable by a set screw 28—see Figs. 3, 4 and 5. On the rear end of the driven shaft 4 is a cam 29 acting on a lever 30 which is pivoted at 31, and the lower end of this lever connects with a slide 32 moving through a suitable guide in the bed and carrying at its inner end a pivoted pawl 33 whose nose or active end is thrown into engagement with a ratchet wheel 34 on the shaft of one of the feed rollers, by means of a spring 35; so that every time the shaft 4 revolves said cam communicates an impulse to the pawl and the stock S is advanced to a certain degree as explained below. The nose or active end the pawl 33 carries a finger 36 which stands adjacent a small crank 37 at the lower end of an upright rod 38 which has a handle 39 standing within ready reach of the operator; and when this handle is turned so that the crank 37 engages the finger, the pawl may be turned aside against the tension of the spring 35 and thrown out of engagement with the ratchet wheel 34 with the result that subsequent impulses imparted to the slide and the pawl will not rotate said ratchet, and the stock will not be fed. For holding the parts in this position with the feed checked, the rod 38 carries a pin 40 adapted to be dropped into a notch 41 (see dotted lines in Fig. 19), whereas when the feed mechanism is at work this pin stands in the notch 42 shown in Figs. 3 and 5. The obvious purpose of the movable bearing 24 is to admit a piece of stock which is of greater or lesser thickness within limits, as this machine is designed for making nuts of a variety of sizes, and even of a variety of shapes, by the use of proper dies.

The male dies for a hexagonal nut are shown in Figs. 9 and 10 and the punch in Fig. 8, while the stock S treated thereby is illustrated in Fig. 11. All of these elements are mounted on the die head 10 as seen in Figs. 6 and 7, and the manner of mounting the dies in the head is best seen in Fig. 12. That is to say, each die has a body 45 notched in its upper edge at 46, and these die-bodies are mounted in a box 47 (see Fig. 22) beneath a removable bar 48 in which are set screws 49 adapted to engage said notches as seen in Fig. 12. The punch 50 is mounted in a hole in a block 51 (Fig. 8) and is also notched as at 52 for the reception of a set screw 53 which, however, holds the punch in the block rather than holding the block under the bar 48. In the rear end of this hole is a pin 54, and this pin, together with the rear ends of all of the punch-bodies, projects into the space back of the box 47 as seen in Fig. 7. In the rear end of the head are seated set screws 55 bearing against these elements and having heads standing within said space and accessible to the operator, and therefore by setting up these screws the dies and the punch may be readjusted forwardly as desired, while their manner of removal as when others are to be substituted is obvious. The first die reached by the stock S is a bifurcated or forked member 57 as seen in Figs. 9 and 21 which produces notches N in the edge of the stock if hexagonal nuts are to be made, and this die is omitted entirely if square nuts are to be made, as seen in Figs. 23, 24, and 25. The second die, or more strictly speaking, the punch 50, has already been described, and it forms the hole H in the stock as seen in Figs. 11 and 25. The third element is a blocking die 58 whose contour is that of the finished nut, and whose use instead of an ordinary chisel which might cut off the finished article will be set forth hereinafter. This die is shown hexagonal in Fig. 10 and square at 59 in Fig. 24. It will be understood that the strokes of the feeding mechanism are so timed that the stock S is fed into the machine and across the several dies (see Figs. 7 and 21) at such times that on the first movement of the die head the stock is notched as at N, then while this head recedes the feeding mechanism advances the stock and on the second movement of the die the hole H is punched, and then when the head again recedes the feeding mechanism projects the stock still further so that on the third movement of said head the blocking die 58 cuts off the work.

The female dies are openings corresponding exactly with the contour of the male dies, said openings being formed in a block 60 having pins 61 and screws 62 by means of which it is secured to what might be called the front face of the web 7; and a die plate 63 held in place by said block 60 behind the same and within a suitable recess 64 in the face of said web, and itself also having openings of the exact size and shape of the several dies employed. This plate I would make of finely tempered steel, and the several openings through it should flare slightly as best seen at 64' in Fig. 15. The block 60 is provided at one side with a feed opening 65 through which the stock S is projected periodically by the feeding mechanism above described, so that it passes across the face of the die plate as seen in Fig. 7; and said block is also provided at its opposite side with an outlet opening 66 through which is ejected the waste produced at this stage of the formation of the nut as described below. Similar openings 67 and 68 through the web 7 permit the escape of the particles cut from the stock in the formation of the notches N and the hole H. The die plate and block are rendered removable by means of the screws 62 so that similar members with different sized or shaped holes may be substituted when the male dies are replaced by others as above suggested. Such change is shown in Fig. 23 where the block and plate have no opening whatever for the forked die 57, because no such die is necessary when a square nut is being cut.

The action of the machine as thus far described will now be as follows: The stock S is fed intermittently by the feeding mechanism across the face of the die plate 63 or between it and the die block 60, and between the impulses of said feeding mechanism the crank 12 causes the reciprocation of the die head 10 in a manner described.

At each forward impulse of said head one die 57 notches the stock, a second die or punch 50 punches a hole in it, and the third die 58 cuts off a blocked nut and projects it into an outlet passage 69 in the web 7. If no further mechanism be provided, these roughly formed nuts will accumulate along the length of this passage as seen in Figs. 7 and 15, and will eventually drop out the rear end thereof behind the web 7 in a manner which will be clear, while the waste material will drop out the openings 66, 67, and 68. But in order to produce a finely finished or "crowned" nut, I prefer to additionally treat the rough blank thus formed, and hence I make use of the following mechanism: Channeled guides 70 are disposed within the passage 69, having transverse pins 71 at their forward ends on which they are pivoted in sockets 72 within the web 7, and having their rearward ends pressed normally toward each other by springs 73; and the inner faces of these guides will by preference approximate the shape of the nuts, with the result that the finished nuts pushed through said passage by the blocking die 58 will travel slowly along the length of said guides as best seen in Fig. 15. The crowning die 74 is preferably held by means of a set screw 75 in a recess 76 within the web 7 above said passage 69, as also shown in this view. Beneath the passage 69 is an outlet passage 77, preferably inclined slightly as shown, and at the inlet end of this passage is the finishing die 78 which gives the final contour to the nut after it has been somewhat flattened out in the act of crowning by the die 74, as well understood by those familiar with this art. The male finishing die 79 is of a size and shape to fit closely within the female finishing die 78, but is smaller than the crowning die 74; and this male finishing die has another function next to be explained.

Suitably guided within the head 13, as by being made triangular as seen in Fig. 7 is an upright block or carrier 80 in a recess or socket in whose face the male finishing die 79 is mounted by suitable means, preferably those employed elsewhere as above described, as shown in Fig. 14. This block partakes of the horizontal reciprocations of the carrier head 13, in addition to which it has a vertical movement of its own produced by the following instrumentalities: Formed in the lower end of said block is a groove 81 in which works a crank pin 82 (preferably having a roller) at the outer end of a crank arm 83 which is mounted on a rock shaft 84 journaled across the frame or bed; and at one side of the latter this shaft carries an upstanding arm 85 slotted as at 86 for the reception of a bearing 87 which is adjustable therein by means of a set screw 88. Said bearing forms the pivot at one end of a connecting bar 89 between the arm 85 and a rocking lever 90 pivoted at 91 to the bed or frame near the other end of the same, and having a roller 92 at its upper end. Fast on the driven shaft 4 (which it will be remembered rotates one-third as rapidly as the power shaft 3) is a cam 93 having three faces 94, 95, and 96 which are respectively low, medium, and high. Finally a spring 97 moves the lever 90 and with it the other parts in a direction to normally cause the descent of the block or carrier 80, so that the roller 92 is held in contact with the cam faces under normal conditions. Setting of the bearing 87 within the slot 86 of the arm 85 increases or decreases the throw or movement of the carrier 80, under the impulse of the action of the various cam faces on the roller 92.

A throw-off is provided by means of a toothed sector 104 fast on the shaft 84, its teeth 102 being engaged by a dog 98 pivoted at 103 and having a handle 99. The latter when raised is held by a clip or stop 100 of any suitable construction, whereas when it is dropped to the dotted position shown in Fig. 3 it rests on another stop or hook 101. When the dog 98 engages the teeth 102 the carrier 80 may be raised by the highest face 96 of the cam 93, but it will remain raised and the cam will revolve idly so that the carrier will no longer descend until the handle 99 is again raised into engagement with the stop or clip 100.

The carrier mechanism also includes a pick-up pin 105 which projects axially through the male finishing die 79 and beyond its active face, this pin being of a size to fit with some friction in the bore of the nut formed and being pressed to the rear step by step through the passage 69, although the friction is not as great as that imparted to the finished nut by the female finishing or shaping die 78 in Fig. 15. The operation of this portion, which is the finishing mechanism, of the machine is as follows: With the parts standing as seen in Fig. 13, the action of the crank 15 on the power shaft 3 moves the carrier head forward until the pin 105 enters the rearmost of the group of nuts within the passage 69. (See Fig. 15.) Fitting the aperture through the nut with some friction, when the crank retracts the head 13 this nut is withdrawn from between the spring-pressed channeled guides 70 and by the pin 105 is carried away from the group referred to. The cam face 96 now comes into action and raises the carrier 80 to its highest position as seen in Fig. 14, where the finishing die 79 is opposite the crowning die 74. The next impulse of the crank 15 throws the parts forward as shown in this view so that the upper side of the nut is crowned in the concave die-block 74, which action will slightly increase the size of the nut although it will not remove it from the pick-up pin. The crank 15 then retracts the mechanism, and the lowest cam face 94 comes into action so that the carrier block 80 drops to the position shown in Fig. 12; and when the crank shaft 8 makes another half revolution the carrier block 80 advances so that the nut which has been crowned and slightly enlarged is forced through the female finishing die 78 as seen in this view, the surplus being sheared or stripped from the enlarged nut, and the finished nut runs down the outlet passage 77 and drops into a suitable receptacle. From this description it will be obvious that the female finishing die 78 must grip the nut with greater friction than the pick-up pin 105, said pin must fit the bore of the rearmost nut in the passage 69 with a greater degree of friction than imparted to said nut by the spring-pressed guides 70, and the latter must bear upon the group of nuts in this passage with gentle but sufficient force to hold them therein as seen in Fig. 15 and to permit them to be pushed along step by step each time a new nut is projected into the inlet end of this passage by the blocking die 58. The action of the forked die 57 in making the notches N in the stock S may not enlarge the latter, but it is quite possible that the action of the punching die 50 in making the hole H will either enlarge or slightly distort the partly finished nut as shown in Fig. 11; and this accounts for my use of a hexagonal blocking die 58 to force the punched blank into the die 62, rather than a die of any other shape which would push the nut into the passage 69.

In the modification illustrated in Figs. 23, 24 and 25, the machine is adapted for making a square nut. In this case the forked die 57 is omitted because no notches N are to be formed in the blank, the same punch 50 as shown in Fig. 8 being employed, and the blocking die 59 is square. It is quite obvious that the male and female dies throughout the remainder of the machine must be replaced by others of a size and shape to handle a square nut, and for this reason the outlet passage 77 is made as large as the size of the largest nut to be formed in this machine because it is immaterial that the nuts fit this passage closely after they have been forced through the final or shaping die 78. All parts are made removable where they are subjected to great wear or strain, especially the dies which of course must be of finely tempered steel. The moving parts are suitably lubricated, and the working parts are bathed in oil in the usual manner, but these details form no part of the present invention and are therefore not elaborated herein.

One detail which I consider important, it may be wise to mention at this time, and I call especial reference to Figs. 6, 7, 12 and 23. I have said above that the web 7 is removably fixed across the bed or table of the machine, and this I consider advisable because as this web is subject to such great strains it sometimes becomes cracked or shattered and must be removed and replaced by a new one. In order to render it quickly removable, without much loss of time while the machine stands idle, I make the table H-shaped in plan view, and above where the cross arm 2ª intersects the side arms I provide the inner faces of the latter with recesses having one square end 2$^b$ and one beveled end 2$^c$, and the web or block 7 is dropped into the recesses as seen in Fig. 6 and rests on the cross arm 2$^a$ as seen in Fig. 12, or it can be lifted out by means of a ring or eye-bolt 7$^a$ with which its upper end is provided. In order to hold this web or block rigidly and fixedly in position, wedges 7$^b$ are inserted adjacent the beveled ends 2$^c$ of the recesses, and these wedges are drawn tight into place by screws 7$^c$ or otherwise. If the web should become cracked or shattered, the screws are loosened and the wedges removed, and then a block and tackle is brought into play and engaged with the ring or eye-bolt 7$^a$ and the entire web lifted out of place. This can be quickly done, and a new one dropped into position and locked by the wedges as will be clear. I consider this quite a feature of my invention for the reason stated above.

What is claimed as new is:

1. In a machine of the class described, the combination with the bed having a transverse fixed web provided with passages standing longitudinal of the bed, guides at opposite sides of said web, heads reciprocating in said guides, stock feeding mechanism, and blocking mechanism carried by one of said heads for acting on the stock to produce nut-blanks and deliver the same through one of said passages in the web; of finishing mechanism on the opposite face of the web and the other head, and carrying mechanism for conveying the nut-blanks to said finishing mechanism, substantially as described.

2. In a machine of the class described, the combination with the bed having a transverse fixed web provided with a passage standing longitudinal of the bed, heads reciprocating at opposite sides of said web, stock-feeding mechanism, and blocking mechanism carried by one of said heads for acting on the stock to produce nut-blanks and deliver the same through said passage; of a finishing die inset into the opposite face of said web, the latter having an inclined outlet passage leading from said die, a male die coacting with said finishing die and carried by the other head, and means for conveying the nut-blanks into position to be acted on by said dies.

3. In a machine of the class described, the combination with the bed having a transverse fixed web provided with passages, guides at opposite sides of said web, heads reciprocating in said guides, stock-feeding mechanism, and blocking mechanism carried by one of said heads for acting on the stock to produce nut-blanks and deliver the same through one of said passages in the web; of a finishing die inset into the opposite face of said web, the latter having an inclined outlet passage leading from said die, a male die coacting with said finishing die, a pick-up pin extending axially through said male die, and means for projecting and retracting and for raising and lowering said male die, for the purpose set forth.

4. In a machine of the class described, the combination with the bed having a transverse fixed web pierced with passages extending longitudinal of the bed, guides at opposite sides of said web, heads reciprocating in said guides, stock-feeding mechanism, and blocking mechanism carried by one of said heads for acting on the stock to produce nut-blanks and deliver the same through one of said passages in the web; of a crowning die inset into the opposite face of said web above such passage, a female finishing die inset in said face below said passage, the web having an inclined outlet passage from this die, a male finishing die, a pick-up pin projecting axially beyond its active end, and means for moving this die vertically and for projecting and retracting it, for the purpose set forth.

5. In a machine of the class described, the combination with a web having a passage through it, and means for feeding nut-blanks step by step through said passage; of a crowning die in said web above such passage, a female finishing die inset in the web below said passage, the web having an inclined outlet leading from this die, a male finishing die, a pick-up pin projecting axially beyond its active end, and means for moving this die vertically and for projecting and retracting it, for the purpose set forth.

6. In a machine of the class described, the combination with a web having a passage through it, and means for feeding nut-blanks step by step through said passage; of a finishing die in said web, the latter having an inclined outlet passage leading from said die, a male die coacting with said finishing die, a pick-up pin extending axially through said male die, and means for projecting and retracting and for raising and lowering said male die, for the purpose set forth.

7. In a machine of the class described, the combination with a web having a passage through it, channeled guides within said passage pivotally mounted at the inlet end thereof, springs normally pressing their opposite ends toward each other, and means for feeding nut-blanks through the passage between said guides; of a female die carried by said web and having an opening adapted to closely embrace a nut-blank, a male die adapted to coact with said die to finish the nut, a pick-up pin projecting beyond the active end of the male die and adapted to enter the hole in said nut-blank with greater friction than that generated by said gripping means, and means for moving the male die.

8. In a machine of the class described, the combination with a fixed web having a passage therethrough, means for feeding nut-blanks through said passage, and means for yieldingly gripping the blanks within such passage; of a female die carried by said web and having an opening adapted to closely embrace a nut-blank, a male die adapted to coact with said die to finish the nut, a pick-up pin projecting beyond the active end of the male die and adapted to enter the hole in said nut-blank with greater friction than that generated by said gripping means, and means for moving the male die.

9. In a machine of the class described, the combination with a fixed member having two passages therethrough, means for feeding nut-blanks through one passage, and means for yieldingly gripping the blanks therein; of a die at the inlet end of the second passage having an opening adapted to closely embrace a nut-blank, a male die adapted to coact with said die to finish the nut, a pick-up pin projecting beyond the active end of the male die and adapted to enter the hole in said nut-blank with greater friction than that generated by said gripping means, a head reciprocating with respect to said member, an upright block movably mounted in said head and carrying the male die, and means for raising and lowering said block between the reciprocations of said head, for the purpose set forth.

10. In a machine of the class described, the combination with a fixed web having a passage therethrough, means for feeding nut blanks through said passage, means for yieldingly gripping the blanks therein, there being a second passage through the web, and a die at its inlet end having an opening adapted to closely embrace a nut-blank; of a male die adapted to coact with said die to finish the nut, a pick-up pin projecting beyond the active end of the male die and adapted to enter the hole in said nut-blank with greater friction than that generated by said gripping means, a head reciprocating with respect to said web, a die carrying block movably mounted in said head, said block being provided with a horizontal groove in its lower end, a crank-arm having a pin loosely engaging said groove, a rock shaft on which said arm is mounted, and connections between said shaft and the driving mechanism for said head whereby the block is raised and lowered between the movements of the head, for the purpose set forth.

11. In a carrier mechanism for a machine of the class described, the combination with the bed having a transverse web pierced with a horizontal passage and an oblique passage, means for feeding nut-blanks into one end of the former, and a means for taking the blanks from the opposite end of this passage and delivering them into the corresponding end of the other passage; of a reciprocating carrier-head mounted in said bed, a vertically movable carrier block mounted in said head and having a groove in its lower end, a crank arm having a pin loosely engaging said groove, a rock shaft on which said arm is mounted, an upright slotted arm fast on said rock shaft, a bearing adjustably mounted in the slot of this arm, and connections between this bearing and the power mechanism for reciprocating said block vertically between the horizontal reciprocations of said head, for the purpose set forth.

12. In a carrier mechanism for a machine of the class described, the combination with the bed having a fixed web across its center, a power shaft journaled across one end of the bed, a driven shaft journaled across the other end of the bed and geared to the power shaft, mechanism for forming nut-blanks actuated by the revolution of said driven shaft, said web having through it a horizontal passage and an oblique passage, and means for forcing the nut-blanks through said horizontal passage; of a carrier head reciprocated by the rotation of the power shaft, an upright carrier block loosely mounted in this head, mechanism carried by the block for transferring said blanks from the horizontal passage to the oblique passage for the purpose set forth, a crank shaft for raising and lowering said block, a spring-actuated lever pivoted to the bed adjacent the driven shaft, a cam on the latter having active faces for regulating the rise and fall of said block, and connections between said lever and crank shaft.

13. In a carrier mechanism for nut-forming machines, the combination with a bed having a fixed web across its center, a power shaft journaled across one end of the bed, a driven shaft journaled across the other end of the bed and geared to the power shaft, mechanism for forming nut-blanks actuated by the revolution of said driven shaft, said web having through it a horizontal passage and an oblique passage, a crowning die above said horizontal passage, a female finishing die in the inlet end of said oblique passage, and means for forcing the nut-blanks through said horizontal passage; of a carrier head reciprocated by the rotation of the power shaft, an upright carrier block loosely mounted in this head, a male die on said block, a pick-up pin therein, a crank shaft for raising and lowering said block, a spring-actuated lever pivoted to the bed adjacent the driven shaft, a cam on the latter having three faces for respectively elevating said block to positions where the die carried thereby will coact with the crowning die, the horizontal passage, or the female finishing die, and connections between said lever and crank shaft.

14. In a carrier mechanism for nut forming machines, the combination with a fixed web having through it a horizontal passage and an oblique passage, mechanism at one side of said web for forming nut blanks and forcing them through the horizontal passage, a crowning die inset into the opposite face of said web above this passage, and a female finishing die inset into this face and at the inlet end of said oblique passage; of a horizontally reciprocating head having an upright guide, a carrier block loosely mounted in the latter, a male die on said block, a pick-up pin therein, and means for moving said block in the guide of the head in steps between the reciprocations of the head, so as to bring the male die successively into register with the crowning die, the horizontal passage, and the female finishing die.

15. In a carrier mechanism for machines of the class described, the combination with a movable block, a rock shaft having a crank arm connected with said block and an upstanding arm, a rocking lever, means for actuating it, and a connecting bar between said lever and arm; of a toothed sector fast on said rock shaft, a pivoted dog, and means by which it may be thrown into engagement with said teeth.

16. In a carrier mechanism for machines of the class described, the combination with a movable block, a rock shaft having a crank arm connected with said block and an upstanding arm, a rocking lever, a spring drawing it in one direction, a cam for moving it in opposition to said spring, and a bar connecting the lever with said upstanding arm; of a toothed sector fast on said rock shaft, a lever pivoted at one end and having a handle at the other end, and a dog on said lever adapted to be thrown into engagement with the teeth of said sector.

17. In a carrier mechanism for machines of the class described, the combination with a movable block, a rock shaft having a crank arm connected with said block and an upstanding arm, a slot in said arm, a bearing adjustable in said slot, a rocking lever, a spring for drawing it in one direction, a cam for moving it in opposition to said spring, and a bar connecting said lever with said bearing; of a toothed sector fast on the rock shaft, a pivoted dog having a handle, a stop on which said handle rests when the dog engages said teeth, and a spring clip for sustaining the handle when the dog is raised out of such engagement, for the purpose set forth.

18. In a punching machine, the combination with a block having a hole through it; of a punch whose shank is inserted in the forward end of said hole and is notched in its upper side, a set screw through the block engaging said notch, a pin in the rear end of said hole, and a set screw making adjustable contact with the rear end of said pin.

19. In a punching machine, the combination with a table substantially H-shaped in plan view, the inner faces of its side bars being recessed above its cross bar and one end of each recess being beveled, a block removably inserted in said recesses and resting on said cross bar, wedges against the beveled ends of the recesses, and means for holding the wedges removably in place, the block having die openings in it; of shafts across the ends of the table, and dies actuated thereby in conjunction with the openings in the block.

In testimony whereof I have hereunto set my hand in presence of two subscribing witnesses.

JOHN R. KREISER.

Witnesses:
 SAMUEL T. MEYER,
 JOHN L. MEYER.